United States Patent [19]

Engel

[11] 4,013,486
[45] Mar. 22, 1977

[54] SPOT SCARFING NOZZLE FOR USE IN GANG ARRANGEMENT

[75] Inventor: Stephen August Engel, Shenorock, N.Y.

[73] Assignee: Union Carbide Corporation, New York, N.Y.

[22] Filed: Aug. 26, 1975

[21] Appl. No.: 607,887

[52] U.S. Cl. .............................. 148/9.5; 239/536; 239/568; 239/594; 239/597

[51] Int. Cl.² .......................................... B23K 7/06

[58] Field of Search .......... 239/536, 568, 594, 597; 148/9.5

[56] References Cited

UNITED STATES PATENTS

| | | | |
|---|---|---|---|
| 1,830,432 | 11/1931 | Hammon | 239/568 |
| 1,958,044 | 5/1934 | Hendricks | 148/9.5 |
| 3,764,122 | 10/1973 | Lytle | 239/505 |

FOREIGN PATENTS OR APPLICATIONS 34,503  10/1973  Japan

*Primary Examiner*—W. Stallard
*Attorney, Agent, or Firm*—Lawrence G. Kastriner

[57] ABSTRACT

A scarfing nozzle for producing a fin-free scarfing cut at least as wide as the width of the nozzle. The nozzle comprises an oxygen gas passage terminating in a nozzle discharge orifice characterized by having a central section and at least one end section. The central section is defined by parallel upper and lower edges and is adapted to discharge a sheet-like stream of cutting oxygen of uniform intensity across the metal body to be scarfed. The end section is defined by having at least one of its edges inclined such that the height of the end section is gradually reduced to a lesser value towards the side edge of the orifice but remaining greater than zero at the edge so as to diminish the intensity of the oxygen stream towards the edge of the orifice to the point where the flow of oxygen discharged at the edge is insufficient to scarf the workpiece but sufficient to produce a fin-free scarfing cut at least as wide as the width of said nozzle. This structure allows a plurality of nozzles to operate side-by-side to produce fin-free cuts of preselected width.

5 Claims, 6 Drawing Figures

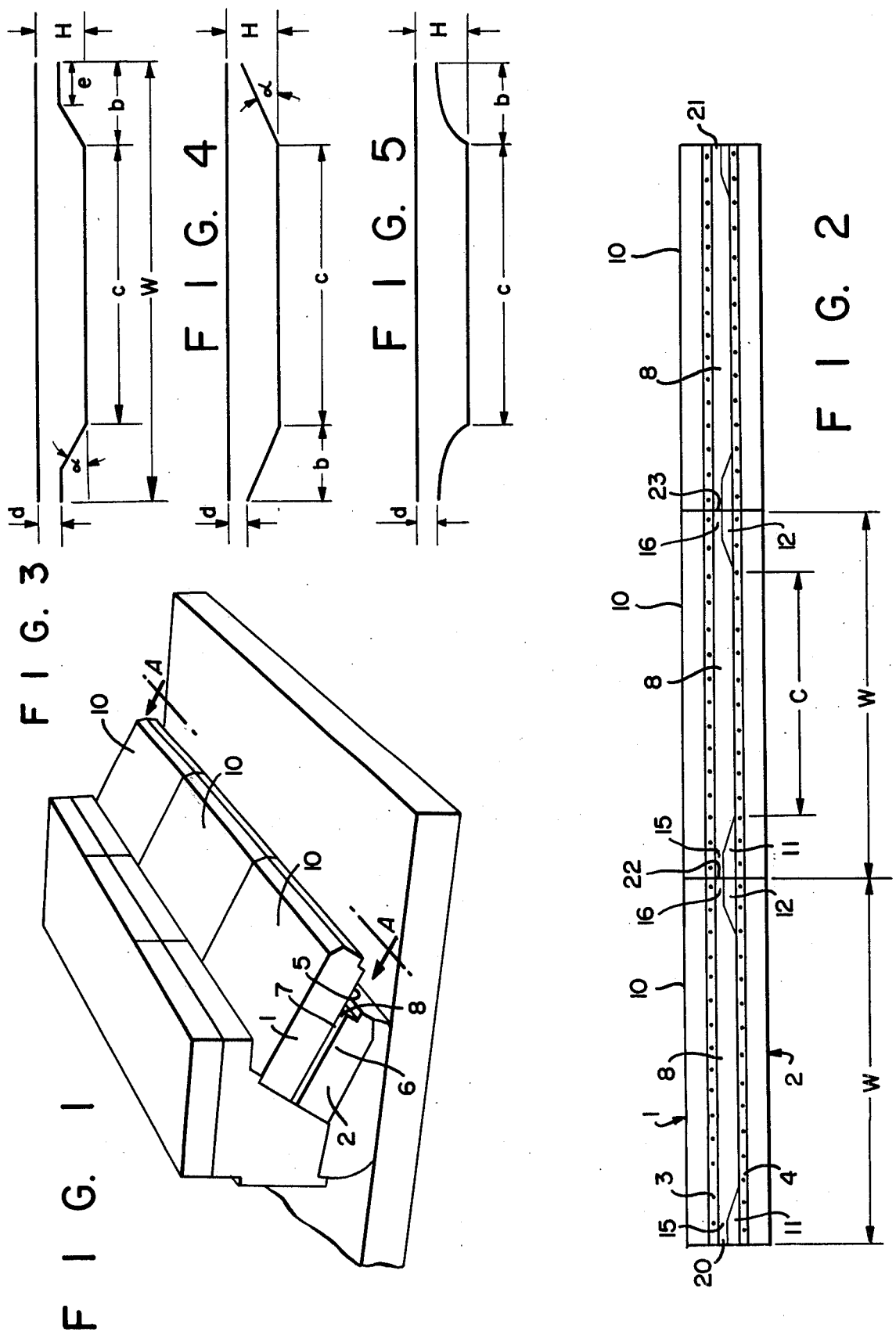

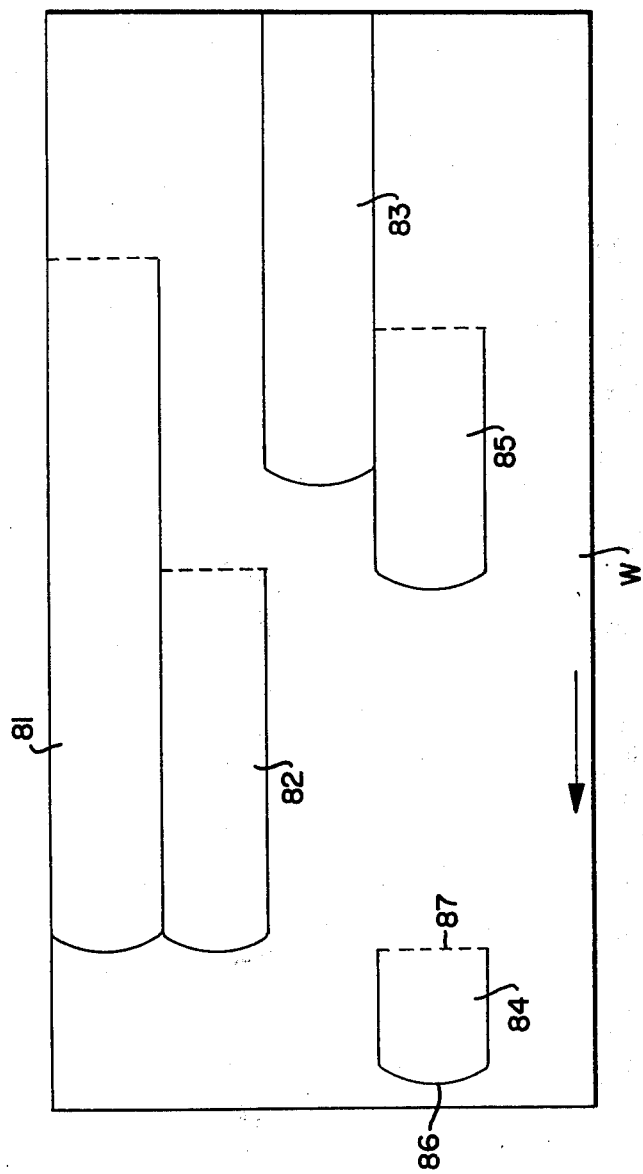
FIG. 6
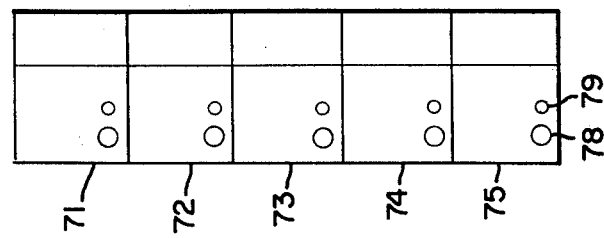

SPOT SCARFING NOZZLE FOR USE IN GANG ARRANGEMENT

BACKGROUND

This invention relates to the thermochemical removal of metal from those specific areas of a workpiece surface which contain defects, a process commonly referred to as "spot" scarfing; and, more specifically, to a scarfing nozzle particularly suited for selective, single pass, fin-free spot scarfing wherein a plurality of adjacent nozzles are used corresponding to the width of the desired cut.

In selective spot scarfing, a plurality of abutting individual scarfing nozzles are spaced transversely across the path of movement of the metal workpiece and are selectively operated so as to scarf only those areas containing surface defects, rather than the entire work surface. A necessary requirement in selective spot scarfing is not only that all scarfing cuts must be made fin-free, but also that they neither overlap adjacent cuts nor cause excessively high ridges therebetween. A spot scarfing nozzle capable of individually scarfing randomly located defects in a metal body without forming fins or ridges of unoxidized metal deposits along the boundaries of the scarfing cut is disclosed in my copending application Ser. No. 607,888, filed of even date herewith, the disclosure of which is incorporated herein by reference.

In a preferred embodiment of a spot scarfing machine, a plurality or bank of adjacent scarfing nozzles, each of which is butted, side-by-side, with other like units, is employed in order to increase the width of metal surface which may be scarfed in a single pass. Thus, such machine may optionally be used to desurface the entire workpiece or, alternatively, selectively scarf randomly located defects. Such a machine is particularly useful in combination with an automatic control system which signals the appropriate scarfing unit to be turned on and off.

Scarfing with a plurality of individual spot scarfing nozzles, of the type described in my above-mentioned copending application, results in an unscarfed portion of the workpiece remaining in the area where the nozzles butt up against each other. This is due to the fact that the aforesaid individual, fin-free scarfing nozzles produce cuts which are narrower than the width of the nozzle discharge orifice. Thus, if two of these nozzles are aligned side-by-side to make two adjacent cuts in a single pass, an unscarfed area will remain between the cuts. Consequently, if a defect as wide as or wider than the width of the nozzle is to be scarfed, it must be done by making at least two consecutive, partially overlapping cuts. This is uneconomical in terms of time, cost of operation and yield loss.

OBJECTS

Accordingly, it is an object of this invention to provide a spot scarfing nozzle capable of making a fin-free cut as wide as the nozzle itself.

It is a further object of this invention to provide a spot scarfing nozzle capable of being operated side-by-side with other like nozzles in a bank to produce continuous, fin-free scarfing cuts without the formation of unacceptable ridges or grooves between the individual cuts.

SUMMARY OF THE INVENTION

The objects set forth above and others which will be readily apparent to those skilled in the art are achieved by the present invention, which comprises:

an oxygen discharge nozzle for selectively scarfing defects in a metal body while avoiding the formation of fins along the boundaries of the scarfing cut, said nozzle being suited for simultaneous side-by-side operation in combination with other like nozzles to produce scarfing cuts at least as wide as the width of said combined nozzles, said nozzle comprising: an oxygen gas passage terminating in a nozzle discharge orifice, said orifice being characterized by having a central section and at least one end section, the central section being defined by parallel upper and lower edges, and being adapted to discharge a sheet-like stream of cutting oxygen of uniform intensity across the metal body to be scarfed, and the end section being defined by having at least one of its edges inclined such that the height of the end section of the discharge orifice is gradually reduced to a lesser value towards the side edge of the orifice but remaining greater than zero at the side edge so as to diminish the intensity of the oxygen stream towards said edge of the orifice to a point where the flow of oxygen discharged at said edge is insufficient to scarf the workpiece but sufficient to produce a fin-free scarfing cut at least as wide as the width of said nozzle, thereby allowing a plurality of said nozzles to operate side-by-side to produce a fine-free cut of preselected width.

In a preferred embodiment of the invention the orifice has two end sections, rather than one, thereby allowing the nozzle to be used with maximum flexibility, i.e., as the individual-cut nozzle, as well as in gang arrangements. In contrast thereto, a nozzle in accordance with the invention having only one end section can only be used in gang arrangement. In this arrangement, the edge of the orifice without an end section is butted up against the corresponding edge of a like nozzle; the end section of the orifice being either free or butted up against another nozzle depending upon the desired width of cut. Thus, for a nozzle having only one end section, the central section of the orifice corresponds to the orifice width extending from said end section to the opposite edge of the orifice. For a nozzle having two end sections, the central section comprises the orifice width between both of the end sections.

DRAWINGS

FIG. 1 is a perspective view of a bank of three scarfing units provided with nozzles according to the present invention in gang arrangement.

FIG. 2 is a front view of the three abutting scarfing nozzles used in the scarfing units shown in FIG. 1 as viewed along line A—A.

FIG. 3 illustrates the front face in cross-section of the nozzle discharge orifice shown in gang arrangement in FIG. 2.

FIGS. 4 and 5 illustrate the front face in cross-section of other embodiments of a nozzle discharge orifice according to the invention.

FIG. 6 is a top view illustrating the manner in which the apparatus shown in FIG. 2 functions to produce selective multi-cut, spot scarfing on a workpiece.

DETAILED DESCRIPTION OF THE INVENTION

Referring to FIG. 1, the individual abutting scarfing units 10 are comprised of conventional upper and lower preheat blocks 1 and 2. The lower surface 5 of upper preheat block 1 and the upper surface 6 of lower preheat block 2 define a continuous slot scarfing oxygen nozzle 7 having a discharge orifice 8.

FIG. 2 which is a view of FIG. 1 along line A—A shows the front face of the three abutting scarfing units 10 containing upper and lower preheat blocks 1 and 2, each containing rows of conventional upper and lower post-mixed preheat fuel flame ports 3 and 4, respectively. The nozzle discharge orifice 8 of each of the scarfing units 10 has a central section C wherein the height of orifice 8 is constant so as to discharge a sheet-like stream of oxygen of uniform intensity across the surface of the workpiece corresponding to said central section. Flow restrictors 11 and 12, which may be inserts, are provided at the side edges 15 and 16, respectively, of each discharge orifice 8 to decrease the height of the orifice at the ends to a sufficiently small value so that the intensity of the oxygen stream discharged from ends 15 and 16 is diminished to the point where the flow of oxygen is insufficient to sustain a scarfing reaction beyond the boundaries of the scarfing cut which corresponds to the width W of orifice 8 — but is sufficient to oxidize any melt blown beyond the aforesaid scarfing cut boundaries.

When the scarfing nozzles are used in gang arrangement, as shown in FIG. 2, the extent to which the flow of oxygen is diminished at the ends of the orifice is critical only at the open or free ends 20 and 21 of the multiple nozzle arrangement where the problem of fin formation arises. At the butted edges 22 and 23 no fins can form, provided the flow of oxygen discharged from the abutting ends of each orifice is sufficient to create a scarfing cut at least as wide as its width W, thereby allowing the adjacent cuts to partially overlap or just meet at butted edges 22 and 23. Thus, as a practical matter, no flow restrictors would be required at the abutting edges if the units were to be continually operated side-by-side in gang arrangement. Howwever, to insure maximum flexibility during spot scarfing, i.e., to be able to selectively spot scarf randomly located defects of varying width located over the entire surface of the workpiece in a single pass, it is imperative that flow restrictors be provided at both ends of each orifice, thereby allowing the nozzles to be used as individual cut nozzles or in gang arrangement depending upon the width of the defect to be scarfed.

FIG. 6 illustrates the manner in which nozzles butted up in gang arrangement, as shown in FIG. 2, operate to produce selective, multi-cut, spot scarfing of randomly located defects in a single pass. Reference to FIG. 6 shows a plurality of adjacent scarfing units 71, 72, 73, 74 and 75, each of which is provided with oxygen and fuel gas to the scarfing unit through passages designated 78 and 79, respectively. The randomly located defects on the surface of workpiece W which are to be spot scarfed are designated 81, 82, 83, 84 and 85. The scarfing operation hereinafter described relates to a preferred mode of spot scarfing characterized by an instantaneous start. This can be advantageously achieved by combining the scarfing nozzle and process of the present invention with the flying start scarfing method disclosed in my copending U.S. patent application Ser. No. 540,455, filed Jan. 13, 1975 now U.S. Pat. No. 3,966,503.

As the moving gang of adjacent scarfing units 71, 72, 73, 74 and 75 come into contact with the workpiece W, a flying start is made by unit 74 as it reaches the front end 86 of area 84, unit 74 thereafter remaining in operation until it reaches the back end 87 of area 84, at which time unit 74 is shut off, and units 71 and 72 are started on the fly. As the gang of scarfing units passes over the workpiece, unit 72 will remain on until it reaches the back end of defective area 82 at which time it will be shut off, either by an operator or a mechanical or electrical signal, while unit 71 remains on. Unit 74 would be turned on again to begin spot scarfing the area designated 85. As the beginning of area 83 is approached by the gang of scarfing units, unit 73 is turned on, unit 74 is turned off as the end of area 85 is reached, and unit 71 is turned off as the end of area 81 is reached. Unit 73 is turned off when the end of area 83 is reached. During the entire spot scarfing pass, unit 75 would remain off, since there are no defects in the zone of the workpiece over which this particular unit passed.

An important feature of the present invention is that the flow restrictors of the scarfing nozzle do not reduce the orifice height at the side edges to zero. This is to prevent the intensity of the oxygen stream from being diminished to the point where the resulting cut is narrower than the orifice width. That is, the nozzle height at the ends or side edges is reduced to a value greater than zero so as to create a fin-free cut which is wide enough to allow a plurality of said nozzles to scarf a workpiece in side-by-side alignment without forming excessive ridges or grooves between adjacent cuts resulting from unscarfed portions of the workpiece. If desired, the cut may also be widened by allowing a portion of the scarfing oxygen stream to be discharged along the sides of the nozzle. Thus, the sides of the nozzle may optionally be open, above the flow restrictors, for a sufficient distance behind the orifice to expand the cut to a predetermined width while avoiding the formation of fins along the cut boundaries. It should be recognized, of course, that as the scarfing cut is made progressively wider than the orifice width, the resulting scarfing reaction becomes progressively less stable within the range of scarfing conditions required to produce a fin-free cut.

The shape of the discharge orifice 8 formed by flow restrictors 11 and 12 and upper and lower preheat blocks 1 and 2, respectively, is shown in FIG. 3 which is a cross-sectional view of the front face of the orifice. Typically, the orifice has a width W of about 8 – 12 inches, a height H of about ¼ inch and a height $d$ at the ends of about 1/12 inch. The lower edge of the discharge orifice is shown inclined at an angle $\alpha$ at a distance $b$ from the ends of the orifice and terminates in a short section $e$ which is parallel to the edges at the central section $c$. The length of $e$ is preferably about 174 inch, but may vary from zero to twice the value of the height H. For a fixed value of $d$ and $e$ the value of $b$ will vary in accordance with the inclined angle $\alpha$ which is generally about 5°–30°. The ratio of $d$/H may vary from about 1:6 to 1:2. For most effective operation, the ratios of $d$/H and $b$/H are preferably about 1:3 and 5:1, respectively at an inclined angle $\alpha$ of 10°. The dimension of width W can vary extensively when the values of $b$, $d$ and H are as defined above and still produce a fin-free cut.

FIG. 4 illustrates another embodiment of the invention similar to the orifice shown in FIG. 3 except that the inclined edges do not terminate at the ends in a relatively short section parallel to the edges at the central section of the orifice. As in FIG. 3, inclined angle $\alpha$ may vary from 5°–30°. For most effective operation, the ratios of $d/H$ and $b/H$ are preferably about 1:3 and 4:1, respectively at an inclined angle $\alpha$ of 10°.

In an alternative embodiment of the invention, the linearly inclined edges of the orifices of FIGS. 3 and 4 may be uniform curves $b$ as shown in FIG. 5. In all embodiments, however, the ratio of the width of the inclined portion of the end section (represented by the general formula: $b - e$) to the height of said inclined portion ($H - d$) should be from about 1:2 to 1:10; the ratio of 1:5 being preferred. For the embodiments shown in FIGS. 4 and 5, $e = 0$.

What is claimed is:

1. An oxygen discharge nozzle for selectively scarfing defects in a metal body while avoiding the formation of fins along the boundaries of the scarfing cut, said nozzle being suited for simultaneous side-by-side operation in combination with other like nozzles to produce scarfing cuts at least as wide as the width of said combined nozzles, said nozzle comprising: an oxygen gas passage terminating in a nozzle discharge orifice, said orifice being characterized by having a central section and at least one end section, the central section being defined by parallel upper and lower edges and being adapted to discharge a sheet-like stream of cutting oxygen of uniform intensity across the metal body to be scarfed, and the end section being defined by having at least one of its edges inclined such that the height of the end section of the discharge orifice is gradually reduced to a lesser value towards the side edge of the orifice but remaining greater than zero at said edge so as to diminish the intensity of the oxygen stream towards said edge of the orifice to the point where the flow of oxygen discharged at said edge is insufficient to scarf the workpiece but sufficient to produce a fin-free scarfing cut at least as wide as the width of said nozzle, thereby allowing a plurality of said nozzles to operate side-by-side to produce a fin-free cut of preselected width.

2. A nozzle as in claim 1 provided with two end sections.

3. A nozzle as in claim 2 wherein the ratio of width to height of the inclined portion of the end section is from about 1:2 to 1:10.

4. A nozzle as in claim 2 wherein the edges of the end sections are linearly inclined at a inclined angle of from about 5°–30°.

5. A nozzle as in claim 4 wherein said inclined edges terminate at the respective ends of the orifice in a relatively short section parallel to the edges of the central section of said orifice.

* * * * *

UNITED STATES PATENT OFFICE
CERTIFICATE OF CORRECTION

Patent No. 4,013,486          Dated March 22, 1977

Inventor(s) Stephen A. Engel

It is certified that error appears in the above-identified patent and that said Letters Patent are hereby corrected as shown below:

In Column 4, line 59, "174" should read --- 1/4 ---.

Signed and Sealed this

Twenty-first Day of June 1977

[SEAL]

Attest:

RUTH C. MASON
*Attesting Officer*

C. MARSHALL DANN
*Commissioner of Patents and Trademarks*